United States Patent
Bozkan et al.

(10) Patent No.: US 6,378,545 B1
(45) Date of Patent: Apr. 30, 2002

(54) ELECTROMAGNETICALLY ACTUATABLE HYDRAULIC PROPORTIONAL VALVE

(75) Inventors: Aytekin Bozkan, Bietighheim; Tilo Hofmann, Ludwigsburg; Christof Ott, Asperg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,103
(22) PCT Filed: Sep. 9, 1999
(86) PCT No.: PCT/DE99/02850
§ 371 Date: Jul. 7, 2000
§ 102(e) Date: Jul. 7, 2000
(87) PCT Pub. No.: WO00/17551
PCT Pub. Date: Mar. 30, 2000

(30) Foreign Application Priority Data

Sep. 24, 1998 (DE) .......................................... 198 43 781

(51) Int. Cl.⁷ ............................................... F16K 31/06
(52) U.S. Cl. ...................................... 137/82; 251/129.08
(58) Field of Search ....................... 137/82; 251/129.15, 251/359, 360, 129.08; 123/568.26

(56) References Cited

U.S. PATENT DOCUMENTS 3,791,360 A * 2/1974 Rieger .................... 137/333 X
5,414,398 A * 5/1995 Schumacher ....... 251/129.15 X

FOREIGN PATENT DOCUMENTS

DE 0 076 459 A * 4/1983
DE 94 10 219 U * 12/1994
DE 195 03 487 A * 8/1996
FR 1 277 797 A * 4/1962

* cited by examiner

Primary Examiner—Kevin Lee
(74) Attorney, Agent, or Firm—Michael J. Striker

(57) ABSTRACT

An electromagnetically actuable proportional hydraulic valve (10) is described, which is distinguished in particular by a constant, low-wear operating performance. This is attained by means of a closing member (60) having an approximately conical sealing body (60c, 70) with a curved dome-like face end oriented toward the valve seat (58). The sealing body (60c, 70) together with the valve seat (58) forms a conical seat valve. The sealing body of the closing member (60) is provided with a flow separation edge (60d), which improves the temperature sensitivity of the proportional valve (10).

14 Claims, 3 Drawing Sheets

US 6,378,545 B1

ELECTROMAGNETICALLY ACTUATABLE HYDRAULIC PROPORTIONAL VALVE

BACKGROUND OF THE INVENTION

1. Field of the Invention

The present invention relates to electromagnetically actuable proportional hydraulic valves and, more particularly, to electromagnetically actuable proportional hydraulic valves having a magnetic part comprising an electrically triggerable coil, a stationary core protruding into the interior of the coil, an armature guided displaceably and acted upon by the coil, which armature is coupled with a closing member, and a valve part provided with at least one inflow conduit, at least one return conduit, at least one work conduit and at least one valve seat, the valve seat being in operative communication with the closing member so as to control a pressure-fluid communication between the work conduit and the return conduit.

2. Description of the Related Art

Among other purposes, electromagnetically actuatable proportional hydraulic valves are used to regulate the pressure in hydraulic circuits, for instance in automatic transmissions of motor vehicles. One such proportional valve is already known as an example from German Utility Model DE-GM 94 10 219. This proportional valve has a magnetic part whose armature acts on a closing member of a valve part and with it forms a flat seat valve. Flat seat valves are distinguished in particular by their insensitivity to errors of alignment between the armature and the closing member; however, because of flow conditions of the closing member, they do tend to vibrate, which over the course of operation can cause leaks and wear. If no counteracting provisions are taken at the closing member, its function is furthermore sharply dependent on the temperature, that is, on the viscosity and hence the viscous friction, of the pressure fluid. This can lead to irregular pressure/current characteristic curves of the proportional valve. Both effects are undesirable, since they impair the functional properties of a hydraulic circuit connected to these valves.

It is an object of the present invention to provide an electromagnetically actuable proportion hydraulic valve of the above-described kind, which has improved stability when subjected to temperature variations and under flow conditions that tend to produce vibrations.

This object and others, which will be made more apparent hereinafter, are attained in an electromagnetically actuatable proportional hydraulic valve, having a magnetic part comprising an electrically triggerable coil, a stationary core protruding into the interior of the coil, an armature guided displaceably and acted upon by the coil, which is coupled with a closing member and a valve part provided with at least one inflow conduit, at least one return conduit, at least one work conduit and at least one valve seat, the valve seat being in operative communication with the closing member in order to control a pressure-fluid communication between the work conduit and the return conduit.

According to the invention the closing member, at least in the region of its end toward the valve seat, has a substantially conical sealing body, whose smaller end face is facing toward the valve seat, and the sealing body has at least one flow separation edge on its end remote from the valve seat.

By comparison, the electromagnetically actuable proportional hydraulic valve according to the invention has the advantage that it behaves substantially in a more stable manner in the face of temperature factors and flow-dictated inducements to vibrations. The pressure/current characteristic curves of the proportional valve have a more constant and steadier course as a result, thus minimizing the expense for programming triggering for the proportional valve. The sealing properties and wear behavior of the proportional valve of the invention are improved. Sensors to detect and compensate for temperature factors and hydraulic circuits can be dispensed with. Further advantages or advantageous refinements of the invention will become apparent from the dependent claims and the following description.

Two exemplary embodiments with particularly advantageous closing members are defined by the dependent claims. In one embodiment the sealing body has a cup-shaped cross section, with a curved face end oriented toward the valve seat. In this embodiment the closing member is distinguished by its simple form and economical manufacture. In other embodiments the armature acts on the closing member by means of a tappet and the sealing body is connected to a guide region that cooperates with a guide member of the housing by means of a connecting portion. In these other embodiments the closing member is especially insensitive to errors of alignment, because its guidance is uncoupled from the armature. In the other dependent claims, features that are advantageous from a production standpoint are disclosed, along with especially suitable usage areas for the proportional valves of the invention.

BRIEF DESCRIPTION OF THE DRAWING

Two exemplary embodiments of the invention are shown in the drawing and described in further detail below.

DESCRIPTION OF THE PREFERRED EMBODIMENT

Figure 1:
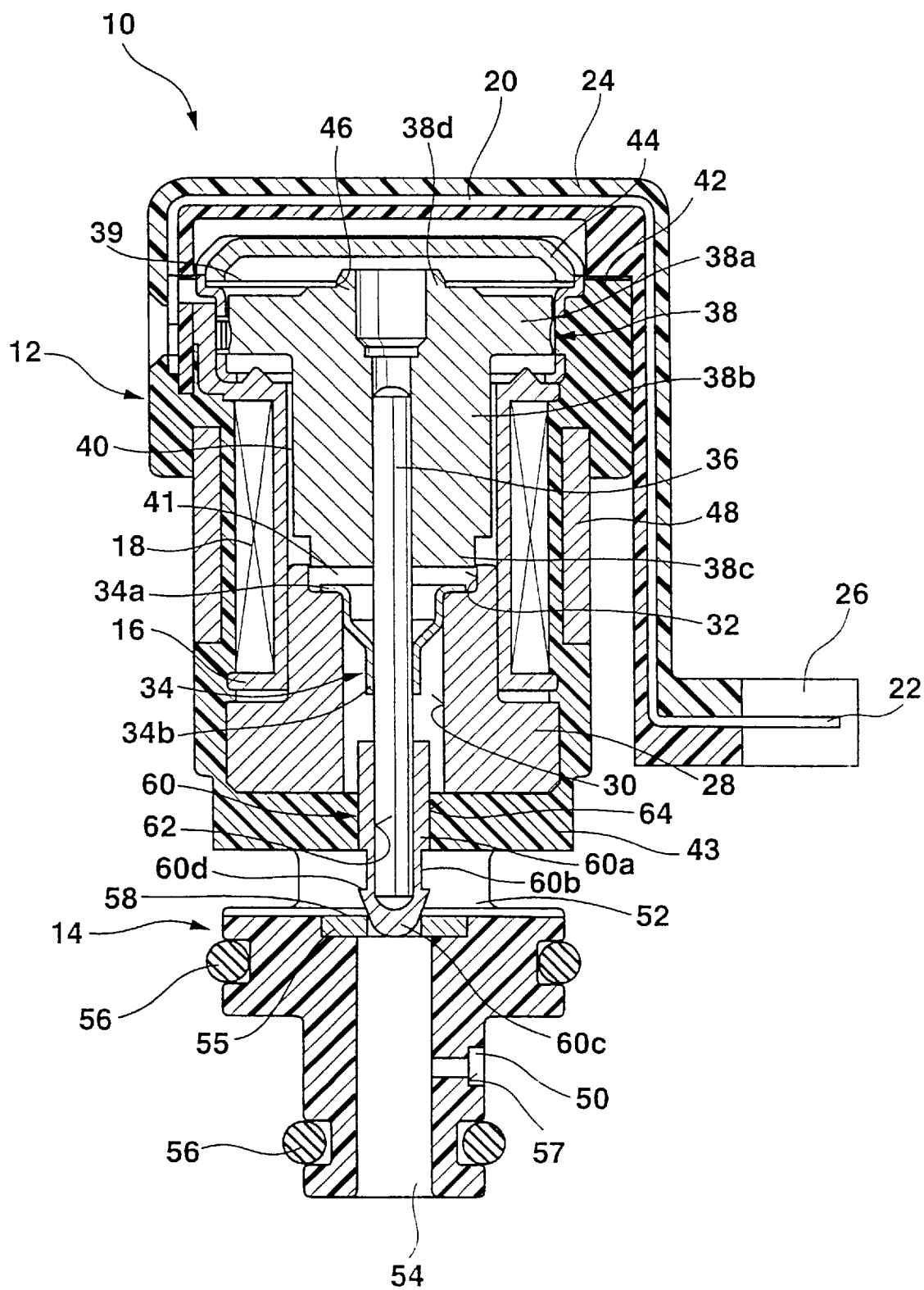
FIGS. 1 and 2 each show one of the exemplary embodiments in longitudinal section.
Figure 2:
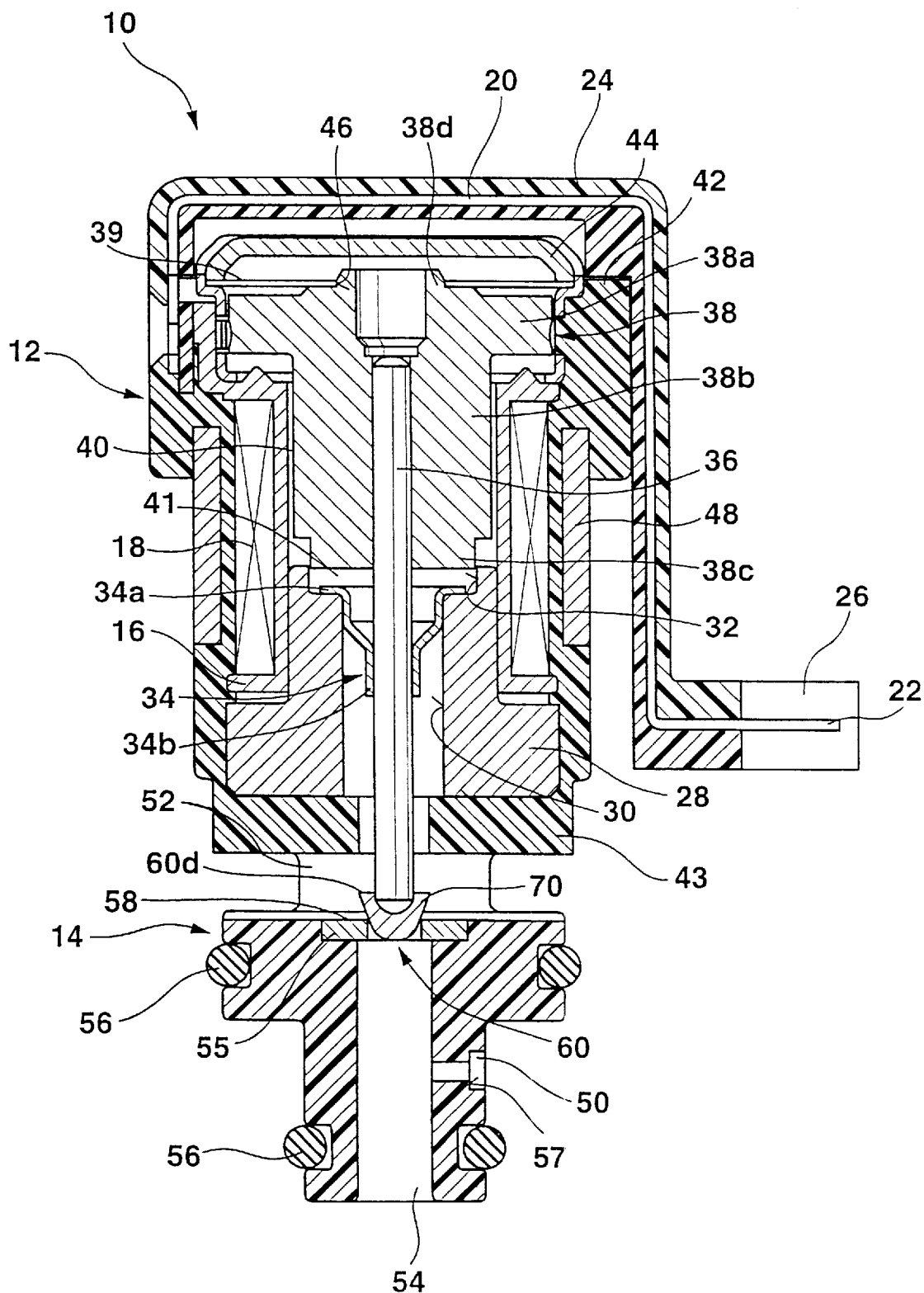

The proportional valves 10 shown in FIGS. 1 and 2 each comprise a magnetic part 12 and a valve part 14, joined integrally to it, that is disposed coaxially with the magnetic part 12. The magnetic part 12 includes a coil 18, wound around a coil body 16; the coil can be triggered electrically by means of lines 20 and contacts 22. The lines 20 are injected into a plastic part 24, which is integrally joined to the coil body 16 and on whose free end a plug housing 26 that receives the contacts 22 is provided.

The coil 18 is hollow-cylindrical, and in its end toward the valve part 14, it receives a core 28 in stationary fashion; the core protrudes in some portions into the interior of the coil 18. This core 28 has a central longitudinal bore 30, which on its end located in the inside of the coil 18 discharges in a sink 32. A guide sleeve 34 with an encompassing collar 34a is braced on the bottom of the sink 32. The guide sleeve 34 has a neck 34b, oriented toward the valve part 14 and extending into the inside of the longitudinal bore 30 of the core 28; the inner wall of the neck on the end of the guide sleeve 34 toward the valve part forms an axial guide for a tappet 36. This tappet is solidly connected to an armature 38, which is located on the end of the coil 18 remote from the valve part 14.

The armature 38 is in the shape of a T, with a head 38a that covers the end face of the coil 18 and a shaft 38b that protrudes into the coil 18. The shaft 38b ends in a protrusion 38c, which can plunge into the sink 32 of the core 28.

To enable a relative motion of the armature 38 relative to the coil 18, a secondary air gap 40 exists between the shaft 38b and the coil body 16. A working air gap 41, which allows a reciprocating motion of the armature 38, can be seen between the end faces, toward one another, of the armature 38 and core 28.

For restoring and centering the armature 38, a spring disk 39 on the end of the proportional valve 10 remote from the valve part 14 is used. In the region of its outer circumference, this spring disk 39 is fastened between a step of a housing 42 of the magnetic part 12 and a cap 44 that closes off this housing 42 from the outside. The cap 44 and the housing 42 are calked together. A recess 46 is provided in the center of the spring disk 39, and it is also calked together with a corresponding protrusion 38d of the armature 38. The housing 42 of the magnetic part 12 is created essentially by spray-coating the individual components that form the magnetic part 12 with plastic. A metal sleeve 48 that surrounds the coil 18 is injected into this housing 42 to form a flux guide element.

The housing 42 of the proportional valve 10 merges with the housing 43 of the valve part 14. In the latter, an inflow conduit 50, return conduit 52 and work conduit 54 are formed. While the work conduit 54 extends along the longitudinal axis of the proportional valve 10, the inlet 50 and the return conduit 52 are embodied as radial conduits. They are sealed off from one another and from the outside by means of ring seals 56. To embody a baffle 57, the inflow conduit 50 is graduated a single time in its inside diameter in the flow direction and is located remote from the magnetic part 12 and discharges flush into the consumer conduit 50. By comparison, the return conduit 52 located toward the valve part 14 is embodied as a continuous recess, that is, a recess that penetrates the work conduit 54.

At the transition region from the work conduit 54 to the return conduit 52, a perforated baffle 55 is injected into the valve part 14. For the sake of wear protection, this baffle is made of high-alloy material, for instance, and it has a sharp-edged valve seat 58. A closing member 60 actuated by the armature 38 cooperates with this valve seat. The proportional valve 10 can therefore also be called a single-edge regulating valve.

Figure 3:
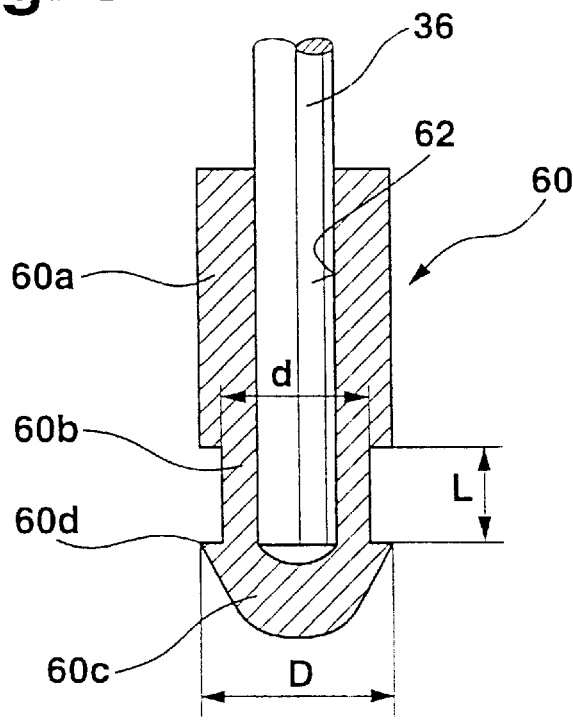
in FIGS. 3 and 4, the closing member 60 is shown as an individual part, enlarged.

In the exemplary embodiment of FIG. 1 and FIG. 3, the closing member 60 is made of a cylindrical guide region 60a toward the magnetic part, a connecting portion 60b adjoining the guide region, and a sealing body 60c that cooperates with the perforated baffle 55. The guide region 60a and the connecting portion 60b have a cylindrical cross section; the sealing body 60c is conical, and for fluidic reasons is curved outward in domelike fashion on the face end toward the valve part. In cross section, the connecting portion 60b has the form of an annular groove, with walls that for instance extend perpendicular to one another. The result at the transition point from the sealing body 60c to the connecting portion 60b is a flow separation edge 60d, which markedly reduces the temperature sensitivity of the proportional valve 10. To that end, the flow separation edge 60d is dimensioned in such a way that the diameter d of the connecting portion 60b is at a ratio of less than or equal to 0.9 to the diameter D of the flow separation edge 60d. Furthermore, the length L of the connecting portion 60b is greater than or equal to half of the difference between the diameter D of the flow separation edge 60d and the diameter d of the connecting portion 60b. Both of these requirements can be expressed mathematically by the following relationships F1 and F2:

F1: $d/D \leq 0.9$;

F2: $L \geq (D-d)/2$.

Furthermore, the closing member 60 is equipped with a central blind bore 62, whose opening is toward the magnetic part 12. The tappet 36 connected to the armature protrudes into this blind bore 62, and a radial clearance exists between the tappet 36 and the blind bore 62. This radial clearance makes it possible to compensate for errors of alignment among the closing member 60, valve seat 58 and tappet 36. The tappet thus serves as a centering or stop means for the closing member 60 in the primary axis; the actual guidance of the closing member 60 is done at the circumference of the guide region 60a, which cooperates with a guide 64 on the housing. The position of this guide is dictated by the injection molding tool for the housing/valve unit and is therefore very precisely aligned with the valve seat 58 formed by the opening of the perforated baffle 55.

Figure 4:
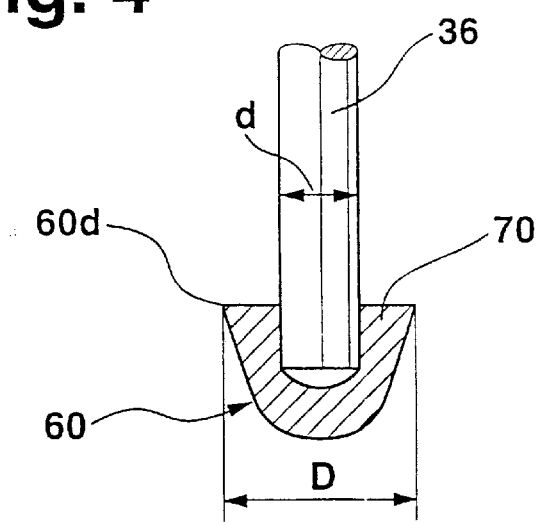

The exemplary embodiment of FIGS. 2 and 4 differs from the exemplary embodiment of FIG. 1 described above in having a simpler and therefore less expensive embodiment of the closing member 60. This closing member comprises only a cup-shaped sealing body 70 with a conical outer contour, and a face end toward the valve part that is likewise curved in domelike fashion outward. This closing member 60 does not have any connecting portion 60b or guide region 60a. Unlike the first exemplary embodiment, the sealing body 70 is solidly connected to the tappet 36, for instance being press-fitted onto the end toward the valve part of the tappet 36. The upper edge of the sealing body 70, located remote from the valve seat 58, forms the flow separation edge 60d, whose production, in contrast to the first exemplary embodiment, requires no separate work steps. This flow separation edge 60d in its dimenions matches those of the first exemplary embodiment of FIG. 1 and in the same way meets the mathematical relationships F1 and F2 explained in the context of that embodiment; given the lack of the connecting portion 60b in the second exemplary embodiment, d now designates the diameter of the tappet 36.

The guidance of the closing member 60 is effected via the guides of the tappet 36 and armature 38; separate guides 64 as in the first exemplary embodiment are not necessary.

The mode of operation of such proportional valves 10 is known per se. In the basic position shown in each case for the proportional valve 10, the coil 18 receives no electrical current, so that the armature 38 is in a neutral position determined by the spring disk 39. In this neutral position, the dynamic pressure of the inflowing pressure acting on the closing member 60 causes the valve seat 58 to be open, so that the consumer conduit 54 is pressure-relieved to the return conduit 52.

Supplying current to the coil 18, because of the armature motion in the direction of the valve part 14, causes a throttling action at the valve seat 58, so that a pressure level results in the consumer conduit 54 that can be adjusted by the supply of current to the coil 18 or in other words by the stroke of the armature 38. At maximum, this pressure level can be adjusted to a value that is determined by the supply pressure, minus the pressure loss at the baffle 57 on the inlet side.

Because of the conical shape of the sealing bodies 60c, 70, the centering of the closing member 60 in the flow of pressure fluid is improved. The flow separation edge 60d embodied in accordance with the relationships F1 and F2 has the effect that the flow of pressure fluid along the closing member 60 already ruptures again early, which reduces the effect of temperature on the pressure/current characteristic curves of the proportional valve 10. As a result, these characteristic curves have a steady course over wide temperature and current ranges.

It is understood that alterations or additions to the exemplary embodiment described are possible without departing from the fundamental concept of the invention. This fundamental concept in particular comprises relieving conventionally known flat seat valves with conical seat valves that are insensitive to flow and temperature, so as to create proportional valves 10 with especially stable functional properties regarding tightness, temperature sensitivity, wear resistance and the course of the characteristic curves, without entailing additional expense in terms of production cost. To that end, according to the invention, closing members 60 with conical sealing bodies 60c, 70 are proposed which have a flow separation edge 60d.

What is claimed is:

1. An electromagnetically actuatable proportional hydraulic valve (10), having a magnetic part (12) comprising an electrically triggerable coil (18), a stationary core (28) protruding into the interior of the coil (18), an armature (38) guided displaceably and acted upon by the coil (18), a closing member (60) coupled with said armature, and having a valve part (14) provided with at least one inflow conduit (50), at least one return conduit (52), at least one work conduit (54) and at least one valve seat (58), said at least one valve seat (58) being in operative communication with the closing member (60) in order to control a pressure-fluid communication between the work conduit (54) and the return conduit (52), characterized in that the closing member (60), at least in the region of its end toward the valve seat (58), has a substantially conical sealing body (60c, 70), whose smaller end face is facing toward the valve seat (58), and that the sealing body (60c, 70) has at least one flow separation edge (60d) on its end remote from the valve seat (58).

2. The electromagnetically actuatable proportional hydraulic valve of claim 1, characterized in that the flow separation edge (60d), with its dimensions, meets the following two mathematical relationships:

$$d/D \leq 0.9,$$

and $$L \geq (D-d)/2,$$

in which D stands for the diameter of the flow separation edge (60d), d stands for the diameter of the component (60b, 36) adjoining the flow separation edge (60d) in the direction of the magnetic part (12), and L stands for the length of this component (60b, 36) adjoining the flow separation edge (60d) in the direction of the magnetic part (12).

3. The electromagnetically actuatable proportional hydraulic valve of claim 1 or 2, characterized in that the sealing body (60c, 70) has a cup-shaped cross section, with a dome-shaped curved face end oriented toward the valve seat (58).

4. The electromagnetically actuatable proportional hydraulic valve of claim 1, characterized in that the armature (38) acts on the closing member (60) by means of a tappet (36), and that the sealing body (70) of the closing member (60) is secured to this tappet (36).

5. The electromagnetically actuatable proportional hydraulic valve of claim 1, characterized in that the sealing body (60c) of the closing member (60) is adjoined in the direction of the magnetic part (12) by a connecting portion (60b), which is adjoined by a guide region (60a).

6. The electromagnetically actuatable proportional hydraulic valve of claim 5, characterized in that the guide region (60a) and the connecting portion (60b) have cylindrical cross sections.

7. The electromagnetically actuatable proportional hydraulic valve of claim 5, characterized in that the connecting portion (60b), between the sealing body (60c) and the guide region (60a) of the closing member (60), is formed by an annular groove of substantially rectangular or square cross section.

8. The electromagnetically actuatable proportional hydraulic valve of one of claims 5–7, characterized in that the closing member (60) has a central blind bore (62), closed off in the region of the sealing body (60c), into which bore a tappet (36) protrudes.

9. The electromagnetically actuatable proportional hydraulic valve of claim 5, characterized in that the armature (38) acts on the closing member (60) by means of a tappet (36), and that between this closing member (60) and the tappet (36), there is at least an operative connection that allows radial motions between the two components.

10. The electromagnetically actuatable proportional hydraulic valve of claim 1, characterized in that the valve seat (58) of the valve part (14) is formed by a bore, whose orifice, at least in the region of the closing member (60), is embodied at a right angle.

11. The electromagnetically actuatable proportional hydraulic valve of claim 1, characterized in that the valve seat (58) is formed on a perforated baffle (55) of wear-resistant material that is anchored in the valve part (14).

12. The electromagnetically actuatable proportional hydraulic valve of claim 1, characterized in that the valve part (14) is a component injection-molded from plastic.

13. The electromagnetically actuatable proportional hydraulic valve of claim 1, characterized in that the magnetic part (12) has a housing (42) that is joined integrally to a housing (43) of the valve part (14).

14. An automatic transmission for motor vehicles, having hydraulic control devices that have at least one proportional valve (10) of claim 1.

* * * * *